United States Patent Office 3,425,188
Patented Feb. 4, 1969

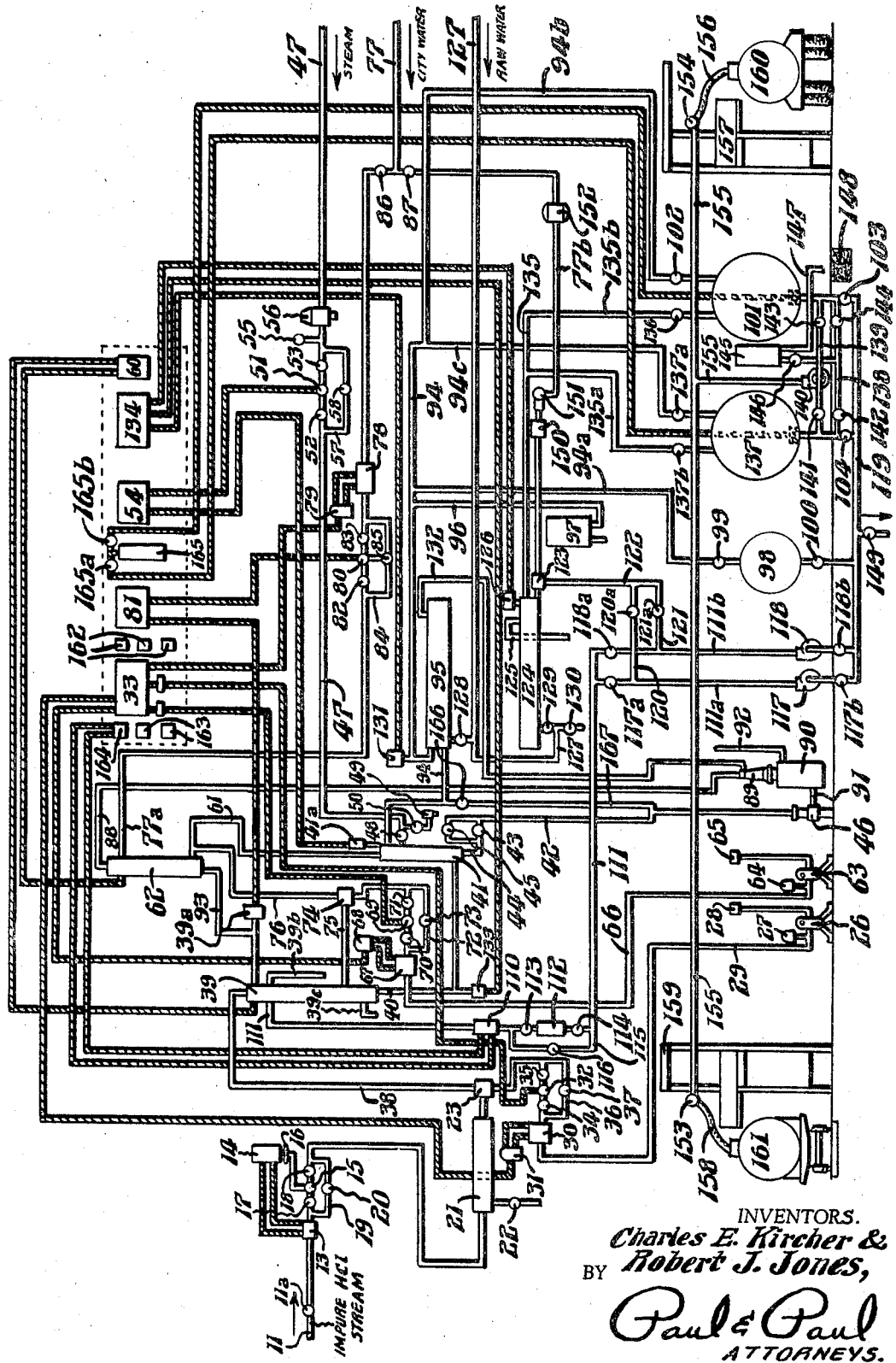

3,425,188
PROCESS FOR THE PRODUCTION OF PURE MURIATIC ACID FROM BYPRODUCT HYDROGEN CHLORIDE
Charles E. Kircher, Detroit, Mich., and Robert J. Jones, Conneaut, Ohio, assignors to Detrex Chemical Industries, Inc., Detroit, Mich., a corporation of Michigan
Continuation of application Ser. No. 356,839, Apr. 2, 1964. This application May 25, 1967, Ser. No. 641,383
U.S. Cl. 55—20                                1 Claim
Int. Cl. B01d 53/00

ABSTRACT OF THE DISCLOSURE

In a process in which hydrogen chloride feed gas is absorbed by water, inert gas is added to the hydrogen chloride gas for the purpose of separating organic impurities from the hydrogen chloride gas upon absorption. The amount of inert gas added is determined by sensed conditions of the feed gas.

---

This application is a continuation of application 356,-839 dated Apr. 2, 1964 and now abandoned.

This invention relates to the production of muriatic acid by the absorption of hydrogen chloride gas in water. More particularly, it relates to the production of pure muriatic acid from the byproduct hydrogen chloride resulting from the production of chlorinated hydocarbons.

The production of muriatic acid by absorbing hydrogen chloride in water is known. Recently the production of muriatic acid from that hydrogen chloride which results from the production of chlorinated hydrocarbons has been practiced, however the hydrogen chloride utilized in this manner is usually contaminated with one or more of the following: (a) chlorine, (b) phosgene, (c) hydrocarbons and (d) chlorinated hydrocarbons. Since all of these impurities are somewhat soluble in muriatic acid, they show up in the final muriatic acid product to varying degrees, depending upon their concentration in the byproduct hydrogen chloride starting material. In the known prior are processes of so producing muriatic acid, the product acid containing one or more of these impurities must be degassed or chemically treated in order to obtain a relatively pure product. For example, chlorine can be removed from muriatic acid with hydrazine, but this is a fairly expensive procedure and can only be used economically to remove trace amounts of chlorine. Higher concentrations of chlorine and organic contaminants are usually removed as a separate step in the muriatic acid process by blowing the acid with some inert gas such as air or nitrogen, or by heating to drive off the contaminants. In either case, a serious disadvantage occurs in that while removing the contaminants, the strength of the muriatic acid is also lowered. This phenomenon is explained by the fact that it is not possible to remove slightly volatile contaminants from the muriatic acid without, at the same time, removing hydrogen chloride which in general is more volatile than the contaminants to be removed. Therefore, in this case it turns out that the resulting purified product still contains measurable amounts of chlorine or organic contaminants or both.

We have now discovered that by avoiding the contamination of muriatic acid by the above mentioned impurities, relatively pure acid may be produced. This is accomplished in accordance with the process of this invention by adding air, nitrogen or other inert dilution gas to the contaminated hydrogen chloride stream before the solution of the hydrogen chloride in the absorbing water begins, thereby avoiding condensation of the impurities from the gas stream, and also continuously controlling the concentration of the impurities in the gas stream as the hydrogen chloride is removed (by solution), thereby preventing contamination of the muriatic acid by solution therein of small amounts of impurities from the gas stream. The addition of the dilution gas may be made in one or more steps, but in any event continuous control is maintained of the time of contact of the gas within the system, and continuous control of the resistance to mass transfer of the impurities from the gas phase into the liquid phase is maintained. It is hereby possible to produce muriatic acid having any desired degree of purity with respect to the contaminants present in the original hydrogen chloride gas stream. This is possible because of the nature of hydrogen chloride solubility in water, whereby the contaminants are held in the gas phase by the inert gas dilution, while the gas is denuded of hydrogen chloride by the contacting water. The contaminants are therefore carried through the system by the inert gases which are discharged from the end of the system. Without this addition of inert gases to a byproduct hydrogen chloride, it is obvious that as the hydrogen chloride is dissolved in water, the concentration and therefore the partial pressure of the contaminants would increase steadily as the hydrogen chloride concentration decreases. In certain cases a condition is reached where an organic contaminant may even condense out of the gas stream in the tail end of the process if its partial pressure reaches a saturation valve for the temperature in question. It was obvious therefore that by the controlled use of inert diluent gases in accordance with the process of this invention to hold the partial pressure of the contaminants at a desirable and predetermined level, while likewise controlling the contact time of the byproduct gas with water, any easy and effective method for the productioin of exceptionally pure muriatic acid from impure byproduct hyddogen chloride is provided.

The process described is particularly advantageous in the production of high strength (22° Bé.) muriatic acid from byproduct HCl as high purity acid can be obtained without having recourse to a final purification step, such as, inert gas purging or boil-off, which as explained above, rapidly denudes the acid of HCl and reduces its strength.

Referring now to the drawing, which represents a flow sheet of the unit processes and operations accomplished in accordance with the process of this invention (instrumentation connections being indicated by cross-hatching), a byproduct hydrogen chloride gas stream is supplied to supply line 11 through valve 11a. This hydrogen chloride gas contains among its impurities one or more of the following: chlorine gas, phosgene, chlorinated hydrocarbon, and minor amounts of other organics. The flow of byproduct gas is measured by a pair of pressure taps 13, which record the flow on a recorder 14, which is in turn adapted to control the flow of this gas through a throttle valve 15 which is actuated by a remote control 16. Valve 15 may be bypassed by use of the valves 17, 18, the bypass 19 and valve 20. Line 11 discharges into an expansion chamber 21, which is provided with a drain therefrom including drain valve 22, and upon leaving the expansion chamber 21, the gas enters a mixing T 23.

A primary supply of compressed air is provided by a primary air blower 26, having a relief valve 27 and an air filter silencer 28 connected thereto, through the primary air line 29. The air flow through line 29 is measured by a pair of pressure taps 30, which operate a relay 31, which is in turn connected to a recorder-controller 33. Flow controller 33, is operatively connected to a throttle valve 32, which provides an automatic control of the air flow in line 29. Valves 34 and 35 are provided to permit the air in line 29 to bypass the throttle valve 32 through a by-pass line 36 and bypass valve 37. The controlled air after passing valve 32 also enters the mixing T 23, wherein the byproduct hydrogen chloride and air are combined to then pass into line 38 and discharge into the top of a concurrent flow cooler absorber 39.

The absorbing water is used to prepare the muriatic acid is provided through a process water line 77, valve 86, pressure taps 78 and throttle valve 80, which water is discharged into the top of a tails tower 62 mounted above the cooler absorber 39. The pressure taps 78 are connected through a relay 79 to the remote controller 33. A bypass 84 is provided around valve 80, and operated by means of valves 82, 83 and 85. The throttle valve 80 is automatically controlled by a remote control 81, which instrument is actuated by a temperature sensor 39a connected into the cooler absorber 39. A line 93 connects the bottom of the tails tower 62 into the top of the cooler absorber 39, thereby providing a concurrent water gas absorption system in the cooler absorber, wherein hydrogen chloride is progressively absorbed by the water, while the air in combination with the impure hydrogen chloride causes the impurities therein to remain in the gaseous phase throughout the absorption process. Heat is removed from the cooler absorber by a flow of tempered water which passes through the shell of the unit through water lines 39b, 39c. The bottoms from the cooler absorber 39 are transferred through line 40 to an acid reboiler 41. The reboiler is provided with a drain line 42, drain valve 43, bypass 44 and bypass valve 45, for connecting into a ceramic plant drain 46. Process steam is admitted through steam line 47, pressure reducer 56, steam controll 51 and valve 48 into the acid reboiler. Valve 51 is adapted to be bypassed by the bypass line 57, valves 52, 53, and 58. Control valve 51 is maintained by a remote control 54, which is in turn activated by a temperature sensor 41a connected into the acid reboiler 41. A pressure gauge 55 is also provided in steam line 47, while a steam drain valve 50 and steam drain 49 are provided adjacent valve 48. The effluent gasses from the acid reboiler 41 pass through line 61 into the bottom of the tails tower 62 whereupon said gases are contacted countercurrently by the absorbing water provided through line 77a into tails tower 62. Line 61 is also connected through line 76 into a mixing tee 74. A line 75 is connected into this missing T 74 and also connected into the bottom of the cooler absorber 39 above line 40.

The mixing T 74 is adapted to receive additional process air from a secondary air blower 63, which is likewise provided with a relief valve 64 and an air filter silencer 65. This additional process air passes through line 66, through pressure taps 67 (which actuate a relay 68 connected into the remote recorder-controller 33), through throttle valve 69, into the mixing T 74. Throttle valve 69 is automatically controllable from the remote controller 33, and is provided with a bypass by means of line 72 and valves 70, 71 and 73. This process air mingles in the mixing T 74 with the residual gas from the bottom of the cooler absorber 39 before entering the bottom of tails tower 62.

Effluent gas from the top of the tails tower 62 passes through fume line 88 into a fume scrubber 89 which is in turn mounted in the top of scrubber tank 90. The fume scrubber 89 is supplied with raw water through a scrubber water line 132, which is in turn supplied through an acid cooler 95, a valve 128 and a raw water line 127. The raw water passing through the acid cooler 95 does not contact the acid therein. The scrubber tank 90 is also provided with a vent 92 and a drain line 91, adapted to discharge into the plant drain 46. The liquid effluent from the acid reboiler 41 passes through a product acid line 94 into the acid cooler 95 from whence the product acid continues through line 94 and into either one of three storage tanks 98, 101, and 137 through lines 94a, 94b and 94c, respectively. The selection of tanks 98, 101 and 137 is provided by means of valves 99, 102 and 137a.

A product pump 140 is adapted to withdraw product acid from tanks 101 and 137 by means of the transfer line 139 and valves 143 and 141 respectively, the output of the pump 140 discharging into a delivery line 155 which terminates at the opposite ends thereof in valves 154, 153. By means of a flexible line 158, valve 153 may be utilized to discharge product acid from line 155 from a loading platform 159 into a tank car facility 161. Likewise, valve 154 is adapted to discharge product acid through the flexible line 156 from the loading tower 157 into a tank truck facility 160.

Valves 100, 103, and 104 are adapted to drain product acid from the tanks 98, 101, and 137 respectively, and are connected into an acid sump line 119, which is in turn provided with a sump drain valve 149. Recycle pumps 117 and 118 are adapted to transfer the contents of line 119 through valves 117b, and 118b, into the recycle branch lines 111a, 111b, which in turn are connected into recycle line 111 by means of valves 117a, 118a. Recycle line 111 passes through valve 114, a rotameter 112, and valve 113 terminating in the top of the cooler absorber 39. A pressure switch 110 is provided in the line 111, and electrically connected to a signal light 164. Line 111 is provided with a bypass 115 including a bypass valve 116. A pair of transfer lines 120, 121 are connected into branch lines 111a, 111b respectively, and through valves 120a and 121a are adapted to transfer recycled acid into the acid dilution line 122, which in turn terminates in a mixing T 123. Process water is provided through line 77, valve 87, integrating meter 152, line 77b, combination check valve and vacuum breaker 151 and check valve 150 into the mixing T 123, where mixing with the recycled acid is carried out, the effluent from the T entering the dilution cooler 124. The cooler 124 is itself cooled by a raw water system including line 127, valve 129, drain 125 and valve 130. A dilute acid line 135 connects the acid cooler 124 into the tanks 101, 137, through lines 135b, 135a and valves 136 and 137b, respectively.

The product acid line 94 is provided with a sampling line 96 which connects into a specific gravity and temperature indicator 97, and with a drain line 167, equipped with a valve 166. A specific gravity indicator 145 is provided and connected through valve 146 into the transfer line 138, a drain 147 from the indicator 145 terminating in a limestone pit 148. Product samples may be admitted into transfer line 138 through either valve 142 or 144.

Temperature sensors 126, 131 and 133 are connected to a temperature recorder 134. A pressure drop indicator 60 is connected to both the tails tower 62 and the cooler absorber 39. A tank level indicator 165 is connected into the product storage tanks 101, 137 by means of valves 165a and 165b. Start and stop switches 162 are provided for pumps 117, 118, 140, and start and stop switches 163 are provided for the blowers 26, 63.

The process in accordance with this invention may be started by first placing all of the valves shown in the drawing in closed position. The electrical power supply to the apparatus (not shown) is then actuated, valves 53, 86, 87, 128 and 129 opened, and the control instruments 33, 54 and 81 set on manual. Instrument air pressure is increased to check the operation of all control valves. The bypass valve 85 is then opened, thereby admitting process water to the tails tower 62 and the cooler absorber 39. Valve 99 is opened to permit initial product acid to enter the startup tank 98. The control valve 80 is manually set to feed sufficient water for the expected gas feed rate to the apparatus. Sufficient time, approximately 10–30 minutes is allowed for the system to fill with water. It is important to note that in the event that the expected gas feed rate is below about 50% of plant capacity, acid recirculation will be necessary. In this event, therefore, the appropriate valves among valves 113, 114, 117a, 118a, 117b, 118b, 100, 104 and 103 are set to permit the recirculation of product acid from either of tanks 98, 101, or 137. Valve 114 is opened two turns, and the selected pump 117 or 118 is actuated, while valve 114 is adjusted until the flow rate of recirculated acid through the rotameter 112 is such that the sum of its water content plus that of the water fed to the tails tower 62 corresponds to the total water required by the process at the operating rate. In the same manner, the recirculation of weak acid produced during startup and operational unbalance periods may be accomplished in order to increase acid strength. Next, the primary air control valve 32 is opened and the blower 26 actuated. Valve 32 is manually set to permit an air flow rate of about 44 volume percent of the expected gas feed rate. Then the secondary air valve 69 is opened and the secondary air blower 63 actuated, with the air flow through valve 69 being manually set at an air flow rate of about 56 volume percent of the expected gas feed rate.

At this time, gas feed valve 11a is slowly opened while noting the absorber acid temperature reading on controller 81 as sensed by the sensor 39a, as well as the pressure drop across the system. As acid production begins, the temperature indicated by means of sensor 39a will rise. At the same time as acid production begins the valves 43 and 45 should be checked to insure that they are in closed position. When the temperature indicated by means of sensor 39a has leveled off as shown by the controller 81 this instrument should be placed on automatic control at the "leveled off" temperature. To achieve the desired acid strength, the specific gravity of the product acid is first checked by the specific gravity indicator 97, and if the strength is low, the temperature setting on controller 81 is raised in increments of from about 5 to about 8 degrees Farenheit until the product acid strength is indicated to be about 1% higher than that desired. The steam control valve 51 and valves 52 and 48 are then opened, the automatic setting of valve 51 being made to hold a temperature corresponding to the desired acid strength. The steam trap drain 49 should be checked for proper condensate drainage. When the acid re-boiler temperature as indicated by means of the sensor 41a on the controller 54, levels off, a renewed check of the acid strength should be made. If the acid strength is then low, the temperature setting on controller 54 should be decreased in increments of about 2° to about 5° F. until the desired acid strength is produced. In order to utilize the storage tanks 98, 101 and 137, valves 99, 137b, 137a, 136, 102, 103, 104 and 100 are arranged as desired to fill the respective product tanks. In the above manner, it has been possible to receive a hydrogen chloride gas stream containing approxmiately 4% by weight of organic contaminants including predominately trichlorethylene, pentachlorethane and perchlorethylene, and to convert this stream continuously into a product muriatic acid having a strength in the range of from about 20.0° to about 22.0° Bé., containing only an amount in the range of from about 60 to about 50 parts per million organics content, and having a water white color.

Having thus described our invention, we claim:

1. In a process for producing muriatic acid, the steps of (1) maintaining a continuous stream of hydrogen chloride gas containing as an organic impurity at least about four percent by weight of a chlorinated hydrocarbon, (2) sensing the temperature and volume of said impure gas, (3) automatically adding a gas inert to said sensed impure gas stream, (4) then contacting said sensed gas stream having added inert gas with water, (5) regulating the contact time during step (4) in response to the sensed flow of impure gas, whereby said inert gas maintains substntially all of said impurity in the gas phase during the time period of gas-water contact of step (4) and (6) recovering muriatic acid substantially free from said impurity.

References Cited

UNITED STATES PATENTS

| 1,563,732 | 12/1925 | Egleson | 55—71 |
| 2,558,011 | 6/1951 | Sprauer et al. | 55—71 |
| 3,140,244 | 7/1964 | Simek et al. | 55—71 X |
| 3,192,128 | 6/1965 | Brandmair et al. | 23—154 |

OTHER REFERENCES

Gaylord et al.: The Falling Film Hydrochloric Acid Absorber. In Chemical Engineering Progress 53(3) pp. 139M–144M, March 1957, 55–71.

REUBEN FRIEDMAN, *Primary Examiner.*

JOHN ADEE, *Assistant Examiner.*

U.S. Cl. X.R.

55—71